United States Patent
Dang Van Nhan et al.

(10) Patent No.: US 7,826,942 B2
(45) Date of Patent: Nov. 2, 2010

(54) METHOD OF MANAGING BRAKING INFORMATION

(75) Inventors: Christophe Dang Van Nhan, Villejuif (FR); Agnes Swierta, Paris (FR)

(73) Assignee: Renault S.A.S., Boulogne Billancourt (FR)

(*) Notice: Subject to any disclaimer, the term of this patent is extended or adjusted under 35 U.S.C. 154(b) by 284 days.

(21) Appl. No.: 11/374,983

(22) Filed: Mar. 15, 2006

(65) Prior Publication Data

US 2006/0238022 A1    Oct. 26, 2006

(30) Foreign Application Priority Data

Mar. 15, 2005  (FR) ................... 05 02525

(51) Int. Cl.
- G01M 17/00 (2006.01)
- G06F 7/00 (2006.01)
- G06F 19/00 (2006.01)

(52) U.S. Cl. ............ 701/29; 701/70; 477/182; 303/122.03

(58) Field of Classification Search ......... 477/182; 303/113.4
See application file for complete search history.

(56) References Cited

U.S. PATENT DOCUMENTS

| | | | | |
|---|---|---|---|---|
| 4,461,958 A * | 7/1984 | Krohling et al. | ............. | 290/45 |
| 5,016,587 A * | 5/1991 | Berger et al. | ................. | 123/359 |
| 5,146,444 A * | 9/1992 | Gleim et al. | ............. | 369/44.41 |
| 5,156,444 A | 10/1992 | Franzke et al. | | |
| 5,230,549 A * | 7/1993 | Osada et al. | ................... | 303/3 |
| 5,495,226 A * | 2/1996 | Vowell | ........................ | 340/479 |
| 5,572,187 A * | 11/1996 | Williford | .................... | 340/454 |
| 5,954,407 A * | 9/1999 | Schramm et al. | ............ | 303/155 |
| 5,983,859 A * | 11/1999 | Bruedigam et al. | ......... | 123/396 |
| 6,076,899 A * | 6/2000 | Isella | ......................... | 303/152 |
| 6,122,577 A * | 9/2000 | Mergenthaler et al. | ........ | 701/34 |
| 6,203,115 B1 * | 3/2001 | Rosendahl et al. | ............. | 303/3 |
| 6,244,675 B1 * | 6/2001 | Behrends et al. | ............ | 303/155 |
| 7,269,762 B2 * | 9/2007 | Heckmann et al. | ............ | 714/47 |
| 7,328,092 B2 * | 2/2008 | Eggert et al. | .................. | 701/29 |
| 2005/0173980 A1 * | 8/2005 | Bohm et al. | ................. | 303/155 |

FOREIGN PATENT DOCUMENTS

GB    1194928    6/1970

* cited by examiner

*Primary Examiner*—Jack Keith
*Assistant Examiner*—Rami Khatib
(74) *Attorney, Agent, or Firm*—Oblon, Spivak, McClelland, Maier & Neustadt, L.L.P.

(57) ABSTRACT

A method of generating braking information for a device including first and second sensors linked to a control unit and designed to sense positioning information concerning a brake pedal moving between released and depressed positions. The method includes transmitting to the control unit, by the first sensor, a first pedal "press" signal and a first "non-press" signal, and transmitting to the control unit, by the second sensor, a second pedal "press" signal and a second "non-press" signal. The method also includes the generation of a first information signal if the first pedal "press" signal and first "non-press" signal are inconsistent and a second information signal if the second pedal "press" signal and the second "non-press" signal are inconsistent, each signal being analyzed independently of the other for this generation.

14 Claims, 3 Drawing Sheets

2 frozen sensors
(F1 & F2)

| STATE | C2 | C1 | C0 |
|---|---|---|---|
| E1 = Non press | 0 | 0 | 1 |
| E2 = Press | 0 | 1 | 0 |
| E3 = Press confirmed | 1 | 0 | 0 |
| E4 = Unavailable | 1 | 1 | 1 |

METHOD OF MANAGING BRAKING INFORMATION

The present invention relates, generally, to a method of managing braking information for motor vehicles.

More specifically, the invention relates to a method of managing braking information for a device comprising first and second sensors linked to a control unit and designed to sense positioning information concerning a brake pedal moving between released and depressed positions;

the method comprising:
 the transmission to the control unit, by the first sensor, of a first pedal "press" signal when the pedal is located between a first depressed position and a fully depressed position and a first "non-press" signal when the pedal is either released or disposed between the first depressed position and a released position,
 the transmission to the control unit, by the second sensor, of a second pedal "press" signal when the pedal is located between a second depressed position and said fully depressed position and a second "non-press" signal when the pedal is either released or disposed between the second depressed position and said released position,
 the processing of the signals transmitted to the control unit including a step for indicating a state of the braking device out of a number of states that can be adopted by the device.

Many vehicles are equipped with means for detecting brake pedal depressed positions and transmitting this information to other systems of the vehicle, such as the braking system, the engine control, the automatic transmission. It is important to ensure that the braking information transmitted is fair, that is, that it corresponds to the real actuation of the pedal.

This is the reason why many vehicle manufacturers have developed diverse solutions for reducing the risk of error in indicating a state of the braking device out of a number of states that the device can adopt.

A method of managing braking information of the previously defined type, providing such an indication of the state of the braking device is, for example, described in U.S. Pat. No. 5,016,587.

This method consists in having two sensors of two different pedal depressed positions, then observing the respective switching of these two sensors when said brake pedal is depressed. When the pedal is depressed, one of the two sensors sends a signal always before the second then the second sensor sends a second signal once the pedal has effectively passed from its first to its second position.

According to this document, if a time of longer than 20 seconds elapses from the moment when the first signal is received without a second signal being sent, then the device is considered defective.

In this context, the object of the present invention is to propose a method of managing braking information that can also indicate a state of the device and reduce the risk of transmission of an erroneous state indication.

To this end, the method of the invention, also compliant with the generic definition given it by the previously defined preamble, is mainly characterized in that whatever the signals transmitted by the second sensor, a first so-called "first frozen sensor" information item is generated if the signal sent by the first sensor is deemed inconsistent in relation to a first pre-established rule and in that whatever the signals sent by the first sensor, a second so-called "second frozen sensor" information item is generated if the signal sent by the second sensor is deemed inconsistent in relation to a second pre-established rule.

It should be noted that the term "signal" denotes a logic level. Thus, a zero electrical signal can still represent a signal in the sense of the present invention. For example, a "non-press" signal can be characterized by a zero volt electrical level at the output of the sensor transmitting this "non-press" signal. Each sensor generates at least two logic levels that are different from each other and denoted S1 and $\overline{S1}$ for the signals generated by the first sensor and denoted S2 and $\overline{S2}$ for the signals generated by the second sensor.

With the method according to the invention, each signal originating from a given sensor is processed independently of the signals sent by the other sensor and according to a particular pre-established rule. If a signal sent by a sensor is deemed inconsistent in relation to that pre-established rule, then an information item (respectively first or second information item depending on whether it is respectively an inconsistency of the first or the second signal) is generated so as to identify a failure of a sensor without necessarily having to take into account an information item originating from the other sensor. Another advantage of the invention is that it can be applied to a large number of devices having at least two pedal position sensors. The relative positioning of one sensor in relation to the other for generating a particular order of the signals when the pedal is depressed is not necessarily required since the inconsistency of a signal originating from one sensor is detected according to a pre-established rule and without taking into account the signals originating from the other sensor. The invention is able to overcome problems associated with the position adjustment of one sensor in relation to another so that one of the sensors is triggered before the other or so that they are triggered simultaneously in a given pedal position. With the invention, it is therefore possible to generate an information item signaling a signal inconsistency, even in cases where the sensor triggering positions are detuned.

Also, with the invention, the risk of generating a wrong inconsistent signal information item is reduced because each signal originating from a given sensor is analyzed independently of the signals originating from the other sensor which can sometimes be erroneous.

It is possible, for example, to arrange for said first and second pre-established rules to be mutually identical.

It is also possible to arrange for the first and/or the second pre-established rule to consist at least in generating the corresponding information item, if the signal originating from the corresponding sensor has remained unchanged for a first predetermined given time.

The expression "remained unchanged" means that there has been no logical change of state of the signal during the time interval concerned. Said first predetermined given time is, for example, ten or so hours of use for vehicles traveling on long journeys without braking, or can be shorter for other vehicles such as town vehicles.

The first predetermined given time is preferably a time interval measured during the vehicle running time, that is, immediately the latter is moved or immediately the engine is started up. For this, the control unit is designed to know when the vehicle is in use.

If the signal sent by one of the sensors does not change during a given time, then there is a high probability that this sensor is frozen. The signal sent by a frozen sensor is not representative of the actual positioning of the pedal. Such a frozen sensor signal should preferably not be taken into account for the indication of certain states of the device. With the invention, a signal sent by a failing sensor is easily detected.

It is also possible to arrange for the first and/or the second pre-established rule to consist at least in generating the corresponding information item, if the signal originating from the corresponding sensor changes too often during a second predetermined given time.

It is, indeed, possible to identify a signal inconsistency if the signal changes logic state too often in a given time.

It is also possible to arrange for the first and/or the second pre-established rule to include an inconsistent signal confirmation operation prior to the generation of the information item, this confirmation operation consisting in observing the signal deemed inconsistent for a third predetermined time and in generating the information item if said signal is still inconsistent at the end of the third predetermined time.

It is possible, for example, to arrange for the processing of said signals by the control unit to include a step for indicating:
- a first "press confirmed" state when the control unit receives the first and second press signals;
- a second "non-press" state when the control unit receives the first and second non-press signals;
- and a third "press" state when the control unit receives only one of said first and second press signals.

Preferably, it is possible to arrange, if only one of said first or second information items is generated, for the control unit to determine the state of the device, solely according to the consistent signal that it receives, not taking into account the other inconsistent signal for determining said state of the device.

A received signal is always interpreted by the control unit using the pre-established rule and this signal is either deemed consistent, in which case the information item (first and/or second information item) is not sent, or deemed inconsistent, in which case the information item (first and/or second information item) is sent. If only one of the first and second signals is consistent, then only that one is taken into account for determining the state of the device.

It is possible to arrange, if said first and second information items are generated simultaneously, for the control unit then to indicate that the device is in a fourth so-called "unavailable" state.

It is also possible to arrange for each indicated state of the device to be encoded on three bits by the control unit and for each of the indicated states to have a specific code different from another code specific to another state of the device.

With this embodiment of the invention, it is possible to define states of the braking device based on the signals originating from the sensors and to indicate these states using codes on at least three bits. These states of the device are then available for other systems of the vehicle such as the engine, the automatic transmission without there being any ambiguity concerning the state of the device.

It is also possible to arrange for each specific code corresponding to a given state of the device to differ by at least two bits from any other specific code corresponding to another state of the device.

This embodiment reduces the risks of wrong interpretation of the codes generated by the control unit, because at least two bits of a code must be changed to obtain another code corresponding to another state of the device.

Other characteristics and advantages of the invention will become clearly apparent from the description that is given below, by way of indication and by no means limiting, with reference to the appended drawings, in which.

As stated previously, the invention relates to a method of managing braking information for a vehicle.

Two sensors are disposed to transmit positioning signals relating to the brake pedal of the vehicle.

The first sensor sends a first press signal when the pedal is depressed beyond a first depressed position and a first non-press signal when the pedal is not depressed or is not depressed far enough to reach the first depressed position.

The second sensor sends a second press signal when the pedal is depressed beyond a second depressed position and a second non-press signal when the pedal is not depressed or is not depressed far enough to reach the second depressed position. Each sensor transmits its signals to the control unit via a dedicated bus. Each signal is stored in a memory of the device then analyzed to detect any inconsistency of the signal in relation to a pre-established rule Fd1 and/or Fd2.

The consistency test Fd1 and Fd2 can consist in sending an information item F1, F2 signaling that a signal is inconsistent if, for a predetermined given period of time, no transition between the first "press" and "non-press" signals is observed and/or if too many transitions are observed.

Figure 1:
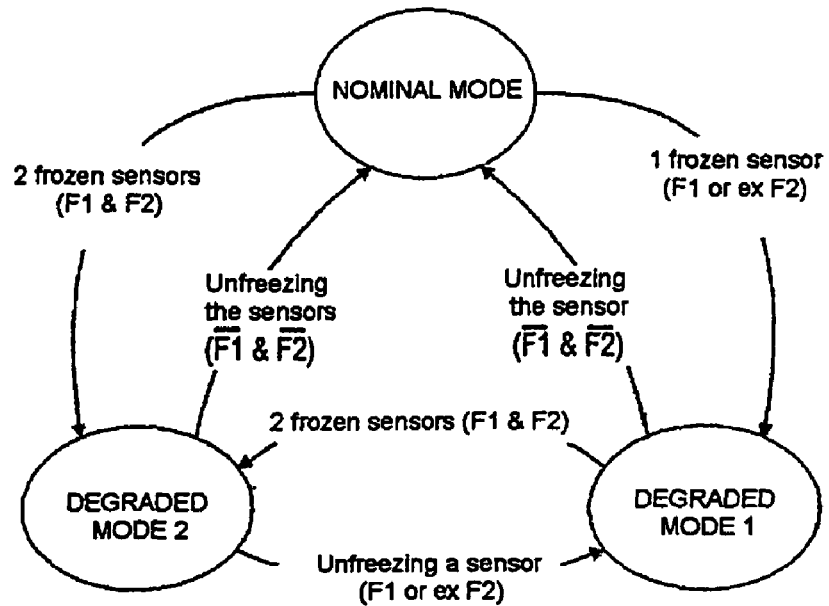
FIG. 1 represents a diagram of the conditions for change of operating mode of the device managed according to the method of the invention.

According to the method of the invention, the braking device can operate in three modes represented in FIG. 1.

The first operating mode is a nominal mode according to the method of the invention. This mode applies when the signals originating from the two sensors are each considered to be consistent according to the pre-established rule corresponding to each signal analyzed.

The second operating mode is a first degraded mode according to the method of the invention. This mode applies when just one of the signals originating from one of the two sensors is considered to be inconsistent according to a pre-established rule corresponding to the signal analyzed and when the other signal originating from the other sensor is considered to be consistent according to another pre-established rule.

The third operating mode is a second degraded mode according to the method of the invention. This mode applies when the two signals originating from the two sensors are considered to be inconsistent according to the pre-established rules corresponding to each signal analyzed.

Figures 5, 6:
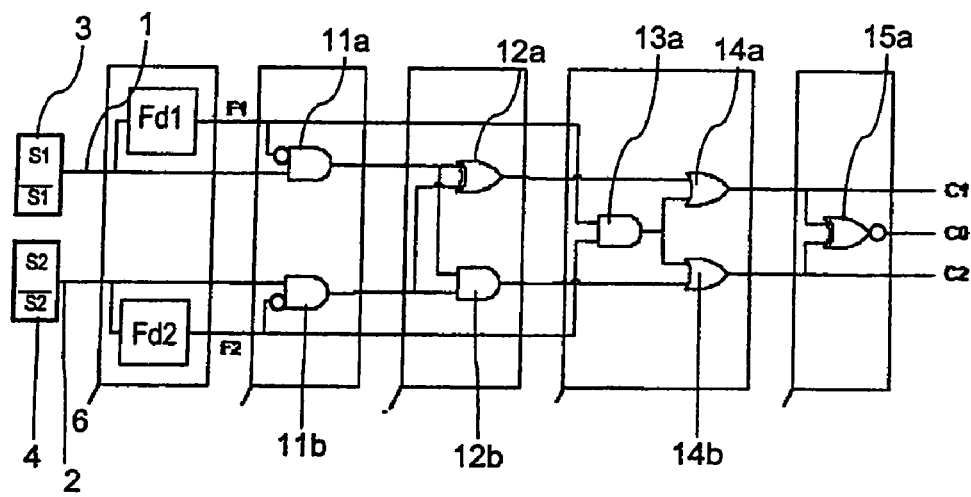
FIG. 5 represents a logic diagram of a circuit for implementing the method according to the invention.
FIG. 6 is a matrix of the state codes of the device generated by the circuit of FIG. 5 according to the signals sent by the sensors.

In FIGS. 1 and 5, F1 is a first information item which indicates that the signal S1 or $\overline{S1}$ originating from the first sensor is inconsistent in relation to a first pre-established rule Fd1.

F2 is a second information item which indicates that the signal S2 or $\overline{S2}$ originating from the second sensor is inconsistent in relation to a second pre-established rule Fd2. According to a particular embodiment of the invention, the rules Fd1 and Fd2 can be mutually identical.

The transition to nominal mode can occur from any other mode as soon as the signals originating from the two sensors are considered to be consistent.

The transition to the first degraded mode can also occur from any other mode as soon as one signal is inconsistent and the other signal is deemed consistent.

The transition to the second degraded mode can also occur from any other mode as soon as the two signals are simultaneously considered to be inconsistent.

The control unit can generate an alert information item for the user of the braking device when at least one inconsistency is detected. Such an alert can, for example, be produced by the illumination of an indicator lamp.

Figure 2:
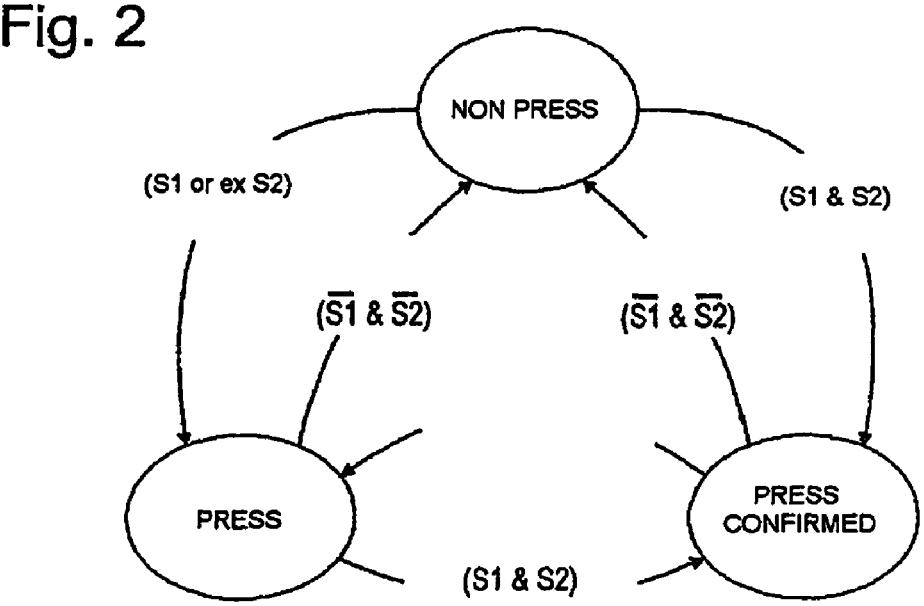
FIG. 2 represents a nominal mode of operation of the device managed according to the method of the invention.

FIG. 2 represents the states indicated by the device managed according to the method of the invention when this device is in the nominal operating state.

Three alternating states—press, non-press or press confirmed—are indicated according to the signals received by the control unit.

The non-press state is indicated if, the signals sent by the two sensors are non-press signals $\overline{S1}$, $\overline{S2}$.

The press state is indicated if at a given instant, only one of the two sensors sends a press signal S1 or S2.

The press confirmed state is generated if the two sensors simultaneously send press signals S1 and S2.

Figure 3:
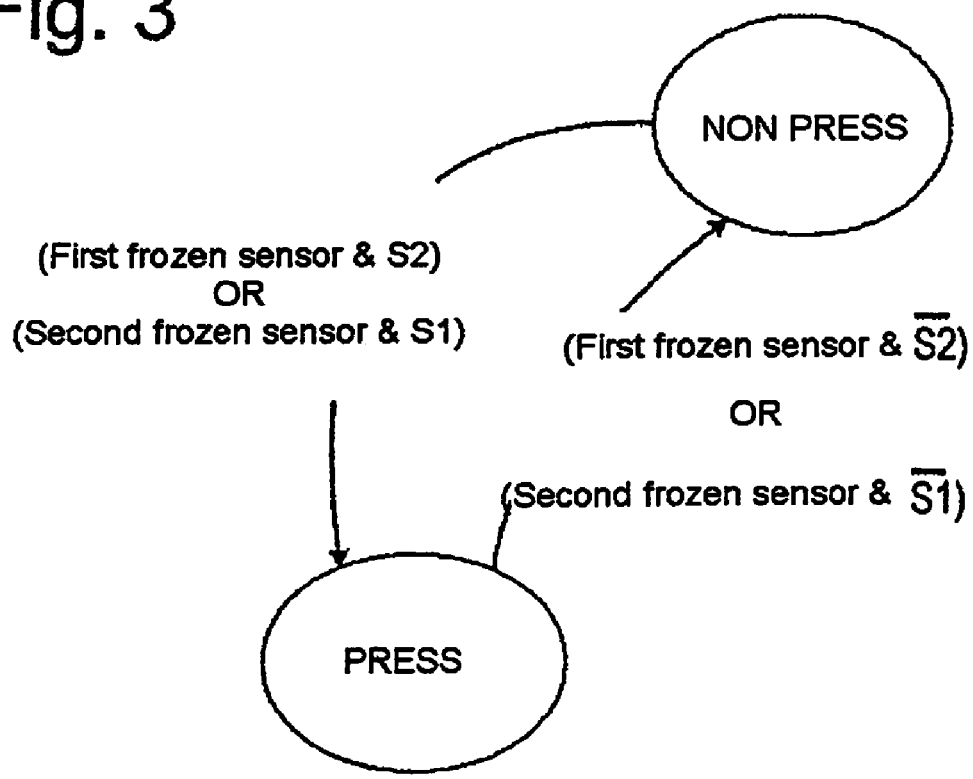
FIG. 3 represents a first degraded mode of operation of the device managed according to the method of the invention.

FIG. 3 represents the first degraded mode or degraded mode 1, that is, when only one of the sensors is considered to be frozen and transmitting an inconsistent signal.

In this first degraded mode, only two states of the device, alternating with each other, can be indicated, that is, the press state and the non-press state.

The press state is indicated if the only consistent signal sent is a press signal S1 or S2.

The non-press state is indicated if the only consistent signal is a non-press signal $\overline{S1}$ or $\overline{S2}$. In this degraded mode, the inconsistent signal is not taken into account in determining the state to be indicated.

Figure 4:
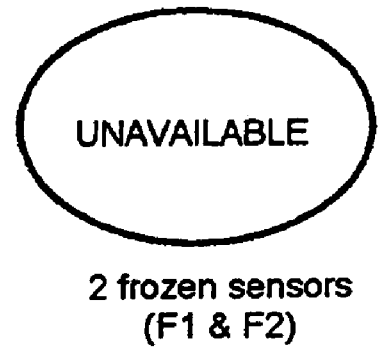
FIG. 4 represents a second degraded mode of operation of the device managed according to the method of the invention.

FIG. 4 represents the second degraded operating mode. In this mode, only one state is indicated: the unavailable state. This state is indicated when the two sensors each transmit a signal deemed inconsistent.

A signal can be inconsistent if it has remained unchanged for a predetermined given time, while the vehicle is running.

The memory can be used to store a log of the signals from each sensor. This memory is, of course, coupled with a clock or with any other means representing a vehicle running time.

With the method of the invention, after having used the vehicle, how long the signal sent by a sensor has remained unchanged is known for each sensor. The unchanged signal time is retained in memory while the vehicle is not in use then re-incremented when the vehicle is returned to use. The re-incrementing is based on restarting from the total time as stored at the end of use of the vehicle.

FIG. 5 represents a logic diagram of a circuit 5 for implementing the method according to the invention.

Two buses 1 and 2 are respectively linked to the first and second respective sensors 3 and 4. Each sensor generates a single signal at a given instant. For the first sensor 3, the signals are a first press signal S1 and a first non-press signal $\overline{S1}$.

For the second sensor 4, the signals sent are a second press signal S2 and a second non-press signal $\overline{S2}$.

A module 6 of the circuit 5 is used to analyze each signal received by the circuit to determine its consistency in relation to a rule Fd1 for the signals from the first sensor and in relation to a rule Fd2 for the signals from the second sensor.

For this, the module 6 includes two test blocks Fd1 and Fd2 which are separate and respectively linked to the buses 1 and 2 of the sensors 3 and 4.

The output of the block Fd1 is linked to an inverted input of an AND logic gate 11a and the other input of this AND logic gate 11a is linked to the first sensor 3 by the bus 1.

The output of the AND logic gate 11a is linked to a first input of an exclusive OR logic gate 12a and to a first input of an AND logic gate 12b.

Symmetrically, the output of the block Fd2 is linked to an inverted input of an AND logic gate 11b and the other input of this AND logic gate 11b is linked to the second sensor 4 by the bus 2.

The output of the AND logic gate 11b is linked to a second input of the exclusive OR logic gate 12a and to a second input of the AND logic gate 12b.

Each output of the blocks Fd1 and Fd2 is linked to respective inputs of a logic gate 13a.

If each sensor sends a signal considered inconsistent then the blocks Fd1 and Fd2 respectively send as output first and second information items F1 and F2. If the outputs of the two blocks Fd1 and Fd2 are respectively F1 and F2, then the two inputs of the logic gate 13a are at 1 and the output of this logic gate also goes to 1 indicating that the two signals received by the control unit are inconsistent.

The output of the exclusive OR gate 12a is linked to a first input of an inclusive OR gate 14a and the output of the AND gate 13a is linked to the other input of the inclusive OR gate 14a. The output of this inclusive OR gate 14a constitutes a first bit C1 for the encoding on three bits of the state of the device 5.

The output of the AND gate 12b is linked to a first input of an inclusive OR gate 14b and the output of the AND gate 13a is linked to the other input of the inclusive OR gate 14b. The output of this inclusive OR gate 14b constitutes a second bit C2 for the encoding on three bits of the state of the device 5.

Each output of each inclusive OR gate 14a and 14b constitutes a respective input of an exclusive OR gate 15a having an inverted output C0. This inverted output C0 constitutes a third bit C0 for the encoding on three bits of the state of the device 5.

FIG. 6 represents the table for encoding, on three bits C0, C1, C2, each state that can be adopted by the device 5.

The state E1 is the non-press state and is encoded by the bit C0 at 1 and the bits C1 and C2 both at 0.

The state E2 is the press state and is encoded by the bit C1 at 1 and the bits C1 and C2 at 0.

The state E3 is the press confirmed state and is encoded by the bit C2 at 1 and the bits C0 and C1 at zero.

The state E4 is the unavailable state and is encoded by all the bits C0, C1 and C2 at 1.

With the method of the invention and this circuit each state code differs from another state code by at least two bits which reduces the risk of confusion between the encoded states.

The invention claimed is:

1. A method of managing braking information for a device including first and second sensors linked to a control unit and configured to sense positioning information concerning a brake pedal moving between released and depressed positions, the method comprising:

transmitting to the control unit, by the first sensor, a first pedal "press" signal when the pedal is located between a first partially depressed position and a fully depressed positior and a first "non-press" signal when the pedal is either released or disposed between the first partially depressed position and a released position;

transmitting to the control unit, by the second sensor, a second pedal "press" signal when the pedal is located between a second partially depressed position and said fully depressed position and a second "non-press" signal when the pedal is either released or disposed between the second partially depressed position and said released position;

processing of signals from the first and second sensors transmitted to the control unit includes indicating a state of the braking device from a plurality of states that can be adopted by the device, wherein regardless of signals sent by the second sensor a first information signal is generated if the first pedal "press" signal and the first pedal "non-press" signal sent by the first sensor are determined to be inconsistent to a first pre-established rule and regardless of signals sent by the first sensor, a second information signal is generated if the second pedal "press" signal and the second pedal "non-press" signal sent by the second sensor are determined to be inconsistent to a second pre-established rule, wherein if said first and second information signals are generated simultaneously, then the control unit indicates that the device is in an unavailable state.

2. The method as claimed in claim 1, wherein said first and second pre-established rules are mutually identical.

3. The method as claimed in claim 1, wherein the first and/or the second pre-established rule generates the corresponding first and/or second information signal, if a signal originating from the corresponding sensor has remained unchanged for a first predetermined given amount of time.

4. The method as claimed in claim 3, wherein the first and/or the second pre-established rule includes an inconsistent signal confirmation operation prior to the generation of the first and/or second information signal, and the inconsistent signal confirmation operation includes observing a signal deemed inconsistent for a second predetermined amount of time and generating the first and/or second information signal if said signal is still inconsistent at the end of the second predetermined amount of time.

5. The method as claimed in claim 1, wherein the first and/or the second pre-established rule generates the corresponding first and/or second information signal, if a signal originating from the corresponding sensor changes too often during a first predetermined given time.

6. The method as claimed in claim 5, wherein the first and/or the second pre-established rule includes an inconsistent signal confirmation operation prior to the generation of the information item, and the inconsistent signal confirmation operation includes observing the signal deemed inconsistent for a second predetermined time and generating the first and/or second information signal if said signal is still inconsistent at the end of the second predetermined time.

7. The method as claimed in claim 1, wherein the processing of said signals by the control unit includes a step for indicating:

a first "press confirmed" state when the control unit receives the first and second press signals;

a second "non-press" state when the control unit receives the first and second non-press signals; and a third "press" state when the control unit receives only one of said first and second press signals.

8. The method as claimed in claim 1, wherein if only one of said first or second information signals is generated, the control unit determines the state of the device, solely according to a consistent signal that it receives, and does not take into account an other inconsistent signal for determining said state of the device.

9. The method as claimed in claim 1, wherein each indicated state of the device is encoded on three bits by the control unit and each of the indicated states has a specific code that is different from another specific code of another state of the device.

10. The method as claimed in claim 9, wherein each specific code corresponding to a given state of the device differs by at least two bits from any other specific code corresponding to another state of the device.

11. The method as claimed in claim 1, wherein the first information signal is not sent if the first pedal "press" signal and the first pedal "non-press" signal sent by the first sensor are consistent to the first predetermined rule.

12. The method as claimed in claim 11, wherein the second information signal is not sent if the second pedal "press" signal and the second pedal "non-press" signal sent by the second sensor are consistent to the second predetermined rule.

13. The method as claimed in claim 1, wherein the first sensor transmits its signals to the control unit via a first dedicated bus and the second sensor transmits its signals to the control unit via a second dedicated bus.

14. The method as claimed in claim 1, wherein a memory stores a log of the signals from the first and second sensor and can store an amount of time each signal of the first and second sensors has remained unchanged.

* * * * *